US010720766B2

(12) United States Patent
Krammer et al.

(10) Patent No.: US 10,720,766 B2
(45) Date of Patent: Jul. 21, 2020

(54) VEHICLE WITH A STORAGE DEVICE THAT CAN BE RECHARGED BY WAY OF A CHARGING CABLE AND AN EXTERNAL POWER SUPPLY

(71) Applicant: Bayerische Motoren Werke Aktiengesellschaft, Munich (DE)

(72) Inventors: Josef Krammer, Holzkirchen (DE); Gerhard Hofer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 270 days.

(21) Appl. No.: 15/403,576

(22) Filed: Jan. 11, 2017

(65) Prior Publication Data

US 2017/0125993 A1    May 4, 2017

Related U.S. Application Data

(63) Continuation of application No. PCT/EP2015/068226, filed on Aug. 7, 2015.

(30) Foreign Application Priority Data

Aug. 7, 2014 (DE) .......................... 10 2014 215 665
Aug. 7, 2014 (DE) .......................... 10 2014 215 668

(51) Int. Cl.
  *H02G 11/02*   (2006.01)
  *H01B 7/08*   (2006.01)
  (Continued)

(52) U.S. Cl.
  CPC .............. *H02G 11/02* (2013.01); *B60L 53/14* (2019.02); *B60L 53/16* (2019.02); *B60L 53/18* (2019.02);
  (Continued)

(58) Field of Classification Search
  CPC .............. B60L 11/1816; B60L 11/1818; B60L 2230/12; B65H 23/1888; H01B 7/0823;
  (Continued)

(56) References Cited

U.S. PATENT DOCUMENTS 3,270,267 A    8/1966 Nolte, Jr.
3,773,987 A *  11/1973 Davis ................. B65H 75/4431
                                                       191/12.4
(Continued)

FOREIGN PATENT DOCUMENTS

AU       23365/95 A       1/1996
DE   10 2007 042 610 A1   3/2009
(Continued)

OTHER PUBLICATIONS

International Search Report (PCT/ISA/210) issued in PCT Application No. PCT/EP2015/068226 dated Dec. 1, 2015 with English translation (Six (6) pages).

(Continued)

Primary Examiner — Mark T Le
(74) Attorney, Agent, or Firm — Crowell & Moring LLP (57) ABSTRACT

A vehicle is provided with a storage device for electrical energy that can be recharged from an external power supply and with a body which has at least one body opening that can be closed by a body flap, wherein a charging cable is provided, connected or connectable in an electrically conducting manner to the storage device and running at least partly inside the body. The body opening is a luggage-compartment opening or a door opening of the vehicle and the body flap is respectively a luggage-compartment lid or a door of the vehicle. The charging cable is formed as a flexible ribbon cable or has at least one flexible ribbon cable portion. The flexible ribbon cable or the at least one flexible ribbon cable portion can be led through a body gap present (Continued)

between a periphery of the body opening and the body flap. The ribbon cable or the at least one flexible ribbon cable portion has current-carrying conductors that are arranged next to one another, are designed as flat conductors of a ribbon form and are surrounded by a common, electrically insulating sleeve.

12 Claims, 8 Drawing Sheets

(51) Int. Cl.
    *B60L 53/18*     (2019.01)
    *B60L 53/16*     (2019.01)
    *B60L 53/14*     (2019.01)
    *B65H 23/188*     (2006.01)

(52) U.S. Cl.
    CPC ....... *B65H 23/1888* (2013.01); *H01B 7/0823* (2013.01); *Y02T 10/7005* (2013.01); *Y02T 10/7088* (2013.01); *Y02T 90/121* (2013.01); *Y02T 90/14* (2013.01)

(58) Field of Classification Search
    CPC . H02G 11/02; Y02T 10/7005; Y02T 10/7088; Y02T 90/121; Y02T 90/14
    USPC ................................. 191/12.2 R, 12.4, 12 R
    See application file for complete search history.

(56) References Cited

U.S. PATENT DOCUMENTS

| | | | |
|---|---|---|---|
| 5,122,406 A * | 6/1992 | Sakamaki | B60J 10/233 296/93 |
| 5,552,565 A * | 9/1996 | Cartier | H01B 7/0861 174/117 F |
| 6,218,952 B1 * | 4/2001 | Borland | B60Q 1/305 340/641 |
| 2008/0128153 A1 | 6/2008 | Lietz | |
| 2011/0065305 A1 | 3/2011 | Amit et al. | |
| 2011/0136375 A1 | 6/2011 | Hatton et al. | |
| 2012/0229085 A1 * | 9/2012 | Lau | B60L 53/305 320/109 |
| 2012/0249069 A1 * | 10/2012 | Ohtomo | B60L 1/08 320/109 |
| 2013/0206528 A1 * | 8/2013 | Enning | B60L 11/1816 191/12.2 R |

FOREIGN PATENT DOCUMENTS

| | | |
|---|---|---|
| DE | 10 2009 057 659 A1 | 7/2010 |
| DE | 10 2009 016 895 A1 | 10/2010 |
| DE | 10 2009 046 327 A1 | 5/2011 |
| DE | 10 2011 013 650 A1 | 11/2011 |
| DE | 10 2011 006 104 A1 | 3/2012 |
| DE | 10 2011 051 052 A1 | 12/2012 |
| DE | 10 2011 085 692 A1 | 5/2013 |
| DE | 10 2011 121 303 A1 | 6/2013 |
| EP | 0 692 849 A1 | 1/1996 |
| EP | 2 813 455 A1 | 12/2014 |
| FR | 2 959 462 A1 | 11/2011 |
| GB | 975264 * | 11/1964 |
| JP | 6139832 * | 5/1994 |
| JP | 2006-306267 A | 11/2006 |
| JP | 2007-324065 A | 12/2007 |
| JP | 2010-287537 A | 12/2010 |
| JP | 2011-113928 A | 6/2011 |
| WO | WO 2009/091745 A2 | 7/2009 |
| WO | WO 2010/117594 A2 | 10/2010 |
| WO | WO 2012/172626 A1 | 12/2012 |

OTHER PUBLICATIONS

German-language Written Opinion (PCT/ISA/237) issued in PCT Application No. PCT/EP2015/068226 dated Dec. 1, 2015 (Five (5) pages).

German-language Search Report issued in counterpart German Application No. 10 2014 215 665.3 dated Apr. 28, 2015 with partial English translation (Thirteen (13) pages).

German-language Search Report issued in counterpart German Application No. 10 2014 215 668.8 dated Apr. 24, 2015 with partial English translation (Thirteen (13) pages).

* cited by examiner

VEHICLE WITH A STORAGE DEVICE THAT CAN BE RECHARGED BY WAY OF A CHARGING CABLE AND AN EXTERNAL POWER SUPPLY

CROSS REFERENCE TO RELATED APPLICATIONS

This application is a continuation of PCT International Application No. PCT/EP2015/068226, filed Aug. 7, 2015, which claims priority under 35 U.S.C. § 119 from German Patent Application Nos. 10 2014 215 665.3 and 10 2014 215 668.8, both filed Aug. 7, 2014, the entire disclosures of which are herein expressly incorporated by reference.

BACKGROUND AND SUMMARY OF THE INVENTION

The present invention relates to a vehicle with a storage device for electric energy that is rechargeable by way of a charging cable and an external power supply unit.

To externally charge batteries of electrically powered vehicles, the vehicle is usually connected to a stationary power supply device (charging station) by way of a charging cable. A charging socket is needed on the vehicle side to charge plug-in hybrid vehicles (PHEVs) and electric vehicles by way of a cable. This socket is conventionally accessible through a charging flap provided in the car body, analogously to a fuel tank filler neck hidden behind a fuel door. This charging socket forms an electrical connecting element located behind the charging flap.

With respect to the charging infrastructure, what are known as Mode 2 and Mode 3 charging have become established. In the case of Mode 2 charging using a household socket outlet, an in-cable box including a protective device (residual-current circuit interrupter) is provided in the cable, and in the case of Mode 3 charging, this protective device is present in the charging station. In some instances, the charging cable is fixedly attached to the charging station.

Thus, plug-in hybrid vehicles so far have needed an additional charging flap for the charging connector, in addition to the fuel door. Since hybrid vehicles, and also all-electric vehicles, are generally derived from conventional vehicles, this means that additional variants of the car body have to be provided. In cases in which dedicated body variants have to be generated, the costs in the individual case are extremely high since a specific body variant has to be created for each base body (right-hand/left-hand drive car, convertible, station wagon, and the like). Providing such a charging flap in the body, possibly in addition to a fuel door, is therefore not only complex since more than one specific body variant must be provided for electric vehicles in one vehicle family, but additionally a flap mechanism has to be developed, manufactured and installed, thereby increasing the costs for an electric vehicle. At times, the installation space for a charging flap along with a charging socket is also not available. In particular, when the charging cable is fixedly installed in the vehicle and is to be extendible through an opening behind a charging flap, it is difficult to find an installation location for a charging flap behind which sufficient space is available for the charging cable and a roll-up mechanism. In any case, the present position of a charging flap on the vehicle side wall is out of the question.

Moreover, it is frequently also undesirable for design reasons to provide such added flaps in the body. It would thus be advantageous if existing body openings could be utilized to feed through a charging cable.

WO 2012/172626 shows and describes a ribbon cable-type charging cable for an electric vehicle, which can be wound onto a safekeeping device in the vehicle interior and guided out through an opening that is provided in the rear bumper and separate from the luggage compartment opening. This separate opening can be closed by way of a flap, but only if the cable is not fed through the opening.

DE 10 2009 016 895 A1 shows and describes a charging connector device for an electrically powered vehicle. A round cable that can be wound onto a cable reel is guided out of the vehicle interior through a body opening that is separate from the luggage compartment opening. This separate body opening can be closed by way of a flap. At the lower edge, the flap has an outwardly curved projection, which creates a groove forming a passage for the round cable. In this way, this body flap can be moved into the closed position thereof even when the round cable is guided out. A seal is provided between the body and the flap; a sealing lip is also provided in the groove. A guide element for the cable is provided on the body side in the region of the groove.

FR 2 959 462 A1 describes and shows a cable feedthrough for a charging cable of an electrically powered vehicle, in which the charging cable having a round cross-section is accommodated in a tailgate of the vehicle and can be pulled out of the same to the outside. The charging cable exiting the tailgate is located outside the tailgate seal, whereby it is not guided out of the body between the tailgate and the body seal thereof.

A charging station for electric vehicles including a cable roll-up system is known from DE 10 2011 051 052 A1, in which the conventional charging cable is wound onto a winding reel. This winding reel can be driven by way of a motor.

WO 2009/091745 A2 also shows a charging station having a charging cable that can be wound onto a winding reel, wherein the charging cable is composed of two round wires that are joined to and disposed next to one another. Guiding elements upstream of the winding reel ensure that the cable does not twist as it is wound up.

From DE 10 2009 046 327 A1, an electric vehicle having an installed conventional charging cable that is wound onto a winding reel and can be unwound therefrom is known, for which purpose the cable can be pulled out of an opening provided on the side of the vehicle.

A roll-up or winding mechanism provided in the vehicle for the charging cable is prone to malfunctions because existing concepts make it necessary to provide sliding contacts for winding up the cable. Such sliding contact connections are expensive and prone to faults. In particular, it must be ensured that the protective ground conductor is always connected. Furthermore, roll-up mechanisms are always problematic because they become hot due to ohmic losses in the cable when the cable is not completely unwound and due to poor heat dissipation.

DE 10 2011 121 303 A1 shows a vehicle having a charging cable that can be pulled out of a lateral opening, wherein the charging cable is accommodated in a cable safekeeping device in the vehicle located behind a separate body flap. The cable safekeeping device is provided with a deflection roller upon which a spring acts and over which the cable is guided, and which is displaced in a translational manner against the force of the spring in the cable safekeeping device when the charging cable is being pulled out of the cable safekeeping device.

A similar cable safekeeping device which is provided in a motor vehicle, but equipped with a plurality of individual deflection rollers, which are each acted upon by a spring and displaceable against the spring force, is known from DE 10 2009 057 659 A1.

These known cable safekeeping devices including deflection rollers for the cable, however, take up a large installation space in the vehicle, which generally is not available for these purposes. Moreover, there is a risk that the cable twists about the longitudinal axis thereof over the course of the useful life and slides out of the deflection rollers or blocks them.

It is the object of the present invention to provide a vehicle with a storage device for electric energy that is rechargeable by way of an external power supply unit, in which separate body flaps for connecting the charging cable can be dispensed with.

This and other objects are achieved by a vehicle according to the invention comprising a storage device for electric energy that is rechargeable by way of an external power supply unit and a body that comprises at least one body opening closable by way of a body flap. A charging cable is provided, which is electrically conductively connected or connectable to the storage device and runs at least in regions in the interior of the body. The body opening is a luggage compartment opening or a door opening, and the body flap is a trunk lid or a door of the vehicle. The charging cable is designed as a flexible ribbon cable or comprises at least one flexible ribbon cable section. The flexible ribbon cable, or the at least one flat ribbon cable section, can be fed through a body gap present between an edge of the body opening and the body flap, and the ribbon cable, or the at least one flexible ribbon cable section, comprises current-carrying conductors, which are disposed next to one another and designed as flat, ribbon-shaped conductors and surrounded by a shared, electrically insulating sheath.

This embodiment of the vehicle makes it possible to utilize existing body openings, such as a luggage compartment opening or a vehicle door opening, to feed the charging cable through, so that no additional body flap has to be provided for connecting the electrical storage device of the vehicle to an external power supply device. Equipping the vehicle with the special charging cable allows the body opening to be closed by way of the associated body flap (trunk lid or vehicle door) while the charging cable is fed through, wherein the charging cable implemented as a flexible ribbon cable is fed through the body gap present between the edge of the body opening and the edge of the body flap in the closed state. Thus, no special provision for the cable feedthrough is necessary, neither on the body flap, nor on the edge of the body opening.

The charging cable, which according to the invention is designed as a very flat, flexible ribbon cable or is provided with at least one very flat, flexible ribbon cable section, can be easily and safely fed with the ribbon cable section between the edge of the existing body opening and the body flap closing the opening. Due to the high flexural elasticity inherent in the design, the ribbon cable section is suitable for conforming to the contours of the body and the body flap, so that the ribbon cable section can be clamped between the edge of the body opening and the closed body flap without the risk of damage in the region of the seal of the body opening, and is not crushed. Due to the particularly flat and highly flexurally elastic configuration of the ribbon cable, or of the ribbon cable section, it is not necessary to provide a large gap dimension between the closed body flap and the body in the region of the cable feedthrough. The low thickness of such a ribbon cable or ribbon cable section, and the high flexural elasticity thereof, which allows very tight bending radii about an axis extending parallel to the longer transverse extension of the ribbon cable or of the ribbon cable section, are made possible by designing the electrical conductors as flat conductors in the ribbon cable or in the ribbon cable section.

In one variant of the invention, it may be provided that the charging cable includes a vehicle-side charging cable portion that is electrically conductively connected to the storage device and an external charging cable portion that is connected to the vehicle-side charging cable portion, or can be connected by way of an electrical connecting device, wherein a vehicle-side connecting element of the connecting device is electrically connected to the vehicle-side charging cable portion, and wherein an external connecting element of the connecting device is electrically connected to the external charging cable portion.

One embodiment should be particularly emphasized, in which the charging cable designed as a ribbon cable, when idle, is accommodated on a cable receiving device provided in the interior of the body, and for use can be pulled out of the body opening. Using a ribbon cable, which is to say a cable having a flat cross-section, as the charging cable has the advantage that the cable can be easily supported in the cable receiving device, so that cable torsion can be effectively prevented, whereby the reliability of the cable roll-up mechanism is increased. Moreover, as was already described, the ribbon cable can take on a very small bending radius in the direction of the small cross-section and conform closely to the contour in the region of the body opening. The elasticity of the seal present in the region of the body opening is usually such that it allows the small cable cross-section.

The cable receiving device can include a winding mechanism, onto which the ribbon cable can be wound. In this case, it is advantageous if a temperature sensor is provided in the region of a winding reel winding up the ribbon cable. The temperature sensor causes the charging process to be shut down or the output to be reduced so as to prevent impermissible heating of the charging cable.

Particularly preferred is one embodiment in which the cable receiving device has a tackle-like retraction mechanism, in which the ribbon cable is guided over at least one deflection roller acted upon by a tensile force from an elastic element.

One advantageous refinement of such a retraction mechanism is for the deflection roller acted upon by a tensile force from an elastic element to be part of a movable deflection roller system composed of a plurality of deflection rollers collectively acted upon by the tensile force from the elastic element, wherein the ribbon cable is guided over each of the deflection rollers of the movable deflection roller system, and the ribbon cable is also guided over at least one fixed deflection roller, in addition to the deflection roller acted upon by the tensile force from the elastic element.

It is particularly advantageous if the fixed deflection roller is part of a stationary deflection roller system composed of a plurality of fixed deflection rollers, wherein the ribbon cable is guided over each of the fixed deflection rollers of the stationary deflection roller system.

This retraction mechanism follows the principle of a tackle. Due to the small bending radius of the ribbon cable, said "tackle" can be implemented in a very flat manner using small rollers. Since the individual cable sections accommodated in this retraction mechanism do not bear on one another, but define spaces between each other, heat dissipation, such as by air convection, is possible. As a result, the maximum current flow is possible, regardless of the degree to which the cable is extended.

The deflection rollers enable a clear guidance of the ribbon cable from the point at which the cable is guided to the outside through the gap between the body opening and the body flap, up to the retraction mechanism.

The retraction mechanism may be disposed in a suitable location in the luggage compartment, for example. The defined cable guidance also allows the cable to be housed in a cable duct to protect the charging cable. For this purpose, the vehicle can advantageously be provided with a cable guiding device in the region of the inner edge of the body opening, by way of which the ribbon cable can be guided from the cable receiving device to the edge of the body opening.

The ribbon cable is preferably fed through a cable cleaning device upstream of the cable receiving device. The self-cleaning of the charging cable thus made possible during retraction into the cable receiving device ensures that the portion of the charging cable located in the vehicle remains clean. It is likewise advantageous that the charging cable must only be extended to such a length as is actually required in each case. Thus, only a small portion, or no portion, of the charging cable will ever be located outside the vehicle on the ground. Since the cleaning mechanism can also wipe off water, freezing of the charging cable accommodated in the cable receiving device is prevented.

The solution according to the invention makes it possible to very conveniently carry out the connection and disconnection process of the charging cable, while storing the charging cable in a protected manner in the luggage compartment. It is not necessary to first roll up the cable manually and store it in the vehicle in a location that is separate from the charging flap.

The invention also includes a charging cable, in particular a charging cable for use in a vehicle according to the invention. In the charging cable according to the invention, in particular for use with a vehicle having a storage device for electric energy rechargeable by way of an external power supply unit, which is designed as a ribbon cable or comprises at least one ribbon cable section, the flexible ribbon cable, or the at least one flexible ribbon cable section, has flat, ribbon-shaped current-carrying conductors that are disposed next to one another and surrounded by a shared, electrically insulated sheath. As seen looking at the cross-section, the flexible ribbon cable, or the at least one flexible ribbon cable section, includes an upper and a lower flat protective ground conductor above and/or beneath the flat, ribbon-shaped current-carrying conductors, the protective ground conductor being likewise surrounded by a shared, electrically insulating sheath (insulation).

The ribbon cable, or the at least one ribbon cable section, preferably additionally includes a signal conductor, which is likewise surrounded by the shared, electrically insulating sheath. This signal conductor is preferably likewise flat and designed in the same manner as the current-carrying conductors.

In one advantageous embodiment of the charging cable, the flat, ribbon-shaped electrical conductors are each formed by wire mesh. Alternatively, the flat, ribbon-shaped electrical conductors can each be composed of a plurality of electrically conducting layers located on top of one another. The flat, ribbon-shaped current-carrying conductors and also the protective ground conductors can thus be formed, for example, by a thin metal strip, multiple metal strips that are located on top of and are movable relative to one another and that form thin electrically conducting layers, or a ribbon-like mesh of thin electrically conducting wires. This composition and the provision of only a single shared electrically insulating sheath ensures high flexural elasticity of the flat charging cable and enables very small bending radii, so that the flat charging cable can easily conform to the body shape in the region of the opening edge and to the shape of the edge of the body flap.

The ribbon cable or the at least one ribbon cable section preferably has a flat upper face and a flat lower face. It is also advantageous if the ribbon cable or the at least one ribbon cable section is provided with a soft, elastic surface at least in regions.

In one advantageous refinement of the charging cable according to the invention, the at least one ribbon cable section is electrically connected to a first cable section of the charging cable by way of a first contacting device and to a second cable section by way of a second contacting device. At least one of the two contacting devices is provided with a soft, elastic surface.

The composition according to the invention of the charging cable comprising the at least one flat protective ground conductor, which is in particular suitable for use in the vehicle according to the invention, has the advantage that, in the case of damage to the ribbon cable section, for example due to improper handling, the protective ground conductor is always disposed between the current-carrying conductors and the body or the body flap, so that the likelihood that a current-carrying conductor makes contact with ground when a ribbon cable section is damaged is significantly reduced.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
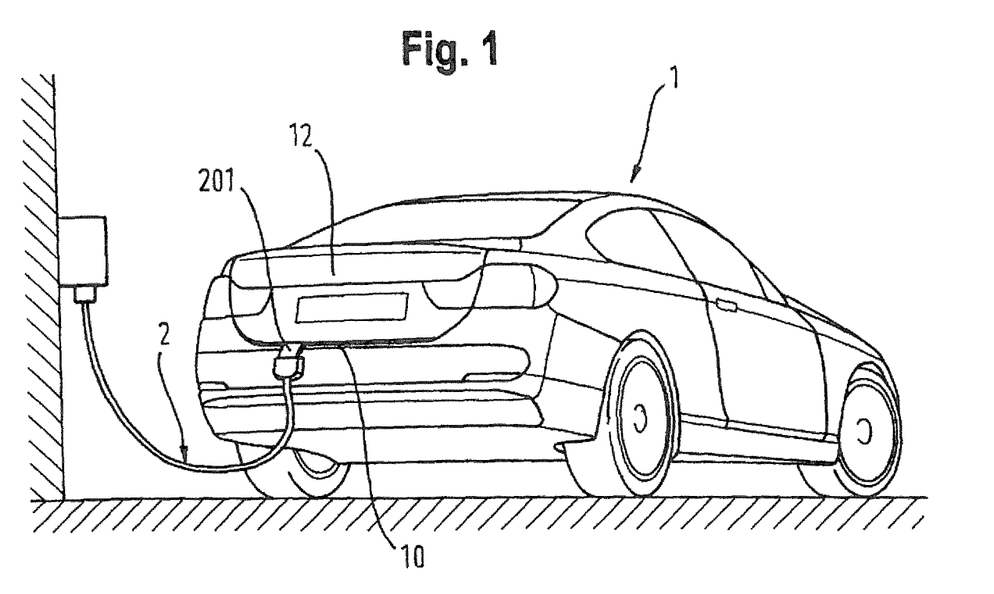
FIG. 1 shows an oblique tail view of a first variant of a vehicle according to the invention, which is connected to a charging station by way of a charging cable according to an embodiment of the invention.

FIG. 1 shows a vehicle 1 according to the invention in a first variant, in which the charging cable 2 is fed through a body opening 10 forming the luggage compartment opening. In the feedthrough region between the luggage compartment opening 10 and a body flap 12 forming the trunk lid, the charging cable 2 is provided with a ribbon cable section 201 to avoid the charging cable 2 from being crushed when the trunk lid 12 is closed and a predefined gap dimension, within the scope of the elasticity of the seal.

Figure 2A:
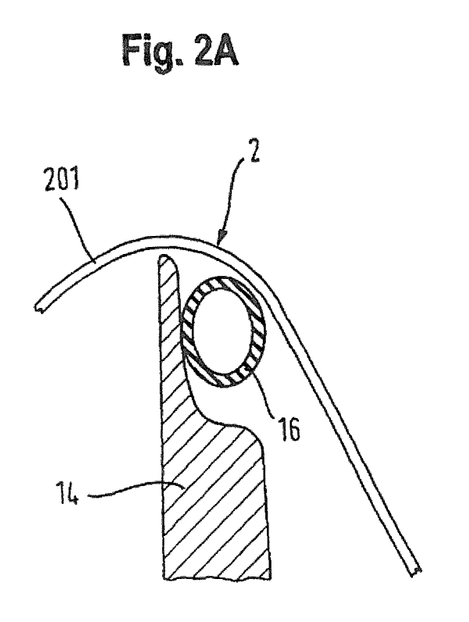
FIG. 2A shows a schematic cross-section through the lower edge of a trunk opening with the trunk lid open.
Figure 2B:
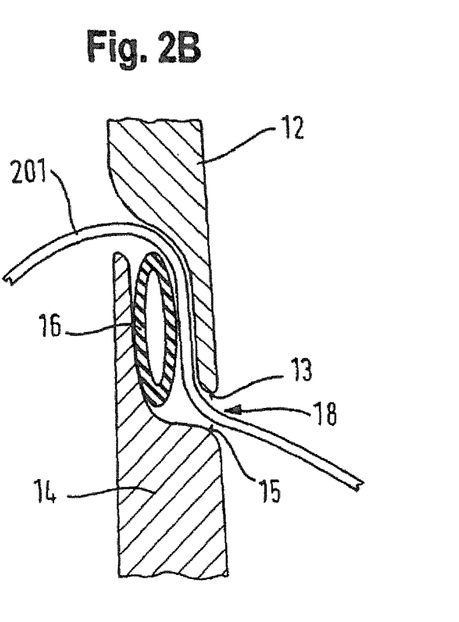
FIG. 2B shows a schematic cross-section through the lower edge of a trunk opening with the trunk lid closed.

FIGS. 2A and 2B show a vertical section through the vehicle body in the region of the trunk lid 12. The ribbon cable section 201 of the charging cable 2 is placed over the lower edge section 14 of the luggage compartment opening 10, which is fixedly installed on the body, and the seal 16 provided thereon, as shown in FIG. 2A. The trunk lid 12 is then closed (FIG. 2B), wherein the ribbon cable section 201 is gently clamped between the lower edge of the trunk lid 12 and the seal 16 as a result of the elasticity of the seal 16. Due to the very flat design of the ribbon cable section 201 and the resultant high flexural elasticity thereof, the ribbon cable section 201 is able to conform to the contours of the lower edge of the trunk lid 12 and of the lower edge section 14 of the luggage compartment opening 10. The ribbon cable section 201 can thus be fed through the existing body gap 18 between the lower edge 13 of the trunk lid 12 and the neighboring upper edge 15 of the edge section 14 of the luggage compartment opening 10, which is fixedly installed on the body, without the ribbon cable section 201 being crushed or kinked beyond a permitted bending radius. The elasticity of the seal 16 allows the ribbon cable section 201 to be fed through the gap 18 between the body opening 10 and the trunk lid 12 without damage.

Figure 3:
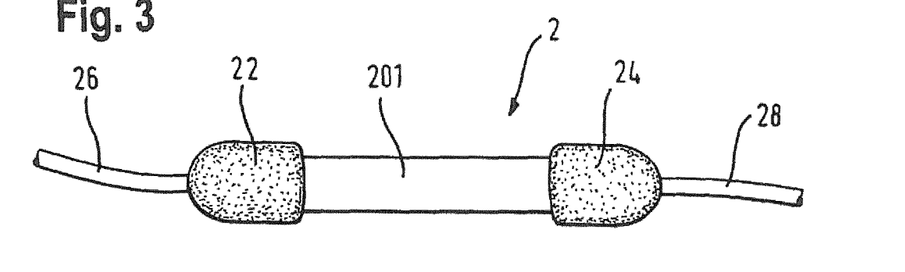
FIG. 3 shows a schematic representation of a ribbon cable section in a charging cable according to the invention.

FIG. 3 shows a section of a charging cable 2 according to the invention including a ribbon cable section 201. The ribbon cable section 201 is electrically conductively connected at its ends to a vehicle-side cable section 26 and an external cable section 28, respectively, by way of a contacting device 22, 24. The vehicle-side cable section 26 and/or the external cable section 28 can be designed as round cables, for example; however, they may also take on any other cable cross-sectional shape. Similarly to the ribbon cable section 201, the contacting devices 22, 24 are provided with a soft, elastic surface to avoid damage to the body surface.

Figure 4:
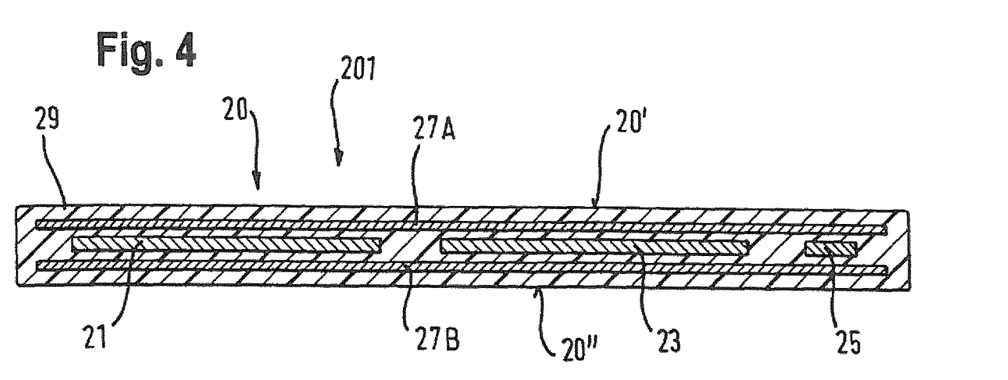
FIG. 4 shows a schematic cross-section through a ribbon cable section in a charging cable according to the invention.

FIG. 4 shows a cross-section through the ribbon cable section 201, which corresponds to a cross-section through a charging cable 2 designed as a ribbon cable 20 according to the invention. The electrical conductors in the ribbon cable 20, or in the ribbon cable section 201, are designed as flat, ribbon-shaped conductors. For example, they may be formed by a wire mesh. A first current-carrying conductor 21 and a second current-carrying conductor 23 are disposed next to one another in a center plane. A signal conductor 25 is disposed next to the current-carrying conductors 21, 23 in the center plane and is likewise designed as a flat, ribbon-shaped conductor. Above the center plane, and thus above the current-carrying conductors 21, 23 and the signal conductor 25, an upper, flat protective ground conductor 27A is provided, which protrudes laterally beyond the current-carrying conductors 21, 23 disposed in the center plane and the signal conductor 25. Beneath the center plane, and thus beneath the current-carrying conductors 21, 23 and the signal conductor 25, a lower, flat protective ground conductor 27B is provided, which likewise protrudes laterally beyond the current-carrying conductors 21, 23 disposed in the center plane and the signal conductor 25.

The current-carrying conductors 21, 23, the signal conductor 25 as well as the upper protective ground conductor 27A and the lower protective ground conductor 27B are surrounded by an electrically insulating sheath 29. The electrically insulating sheath 29 can, as is schematically shown in FIG. 4, directly envelope each of the conductors 21, 23, 25, 27A and 27B; however, it is also possible for each of the conductors 21, 23, 25, 27A, 27B to initially be surrounded by a separate insulation and then be embedded into the insulating sheath 29. Preferably, however, a single, shared covering is provided as the highly flexible and easy to bend insulation.

The flat design of the ribbon cable 20, or of the ribbon cable section 201, allows good bendability in one direction and yields high rigidity in the direction orthogonal thereto. As a result of a protective ground conductor monitoring function of the charging cable 2 provided in the vehicle, and a deactivation in the event of a fault, the insulation requirement may be reduced to simple insulation by way of the electrically insulating sheath 29. This decisively contributes to a flat, flexible and easy to bend configuration of the cable. This composition is made possible by the provision of a residual-current circuit interrupter present in the charging cable or in a charging station, which interrupts the flow of current in the event of a cable break or cable damage when one of the protective ground conductor is exposed or comes in contact with a current-carrying conductor.

In the "vertical direction" of the ribbon cable 20 or of the ribbon cable section 201, which is to say in the direction of the shorter cross-sectional extension, this results in very small dimensions due to the absence of the requirement of double insulation. The conductor cross-sections are designed in such a way that typical charging rates for PHEV vehicles are possible. The conductors may be layered to further increase the flexibility. Instead of one metal layer having a thickness of 0.1 mm or 0.05 mm, multiple layers having a thickness of 0.01 mm, for example, can be used.

By disposing multiple ribbon cable sections in the charging cable, the cable can be fed out of the luggage compartment at the respective required location. In particular, it is also possible to implement the entire charging cable as a ribbon cable having such a composition corresponding to the cable cross-section shown in FIG. 4. In this case, stabilizing elements may be provided at regular intervals, which prevent the cable from curling up in the transverse direction.

Figure 5:
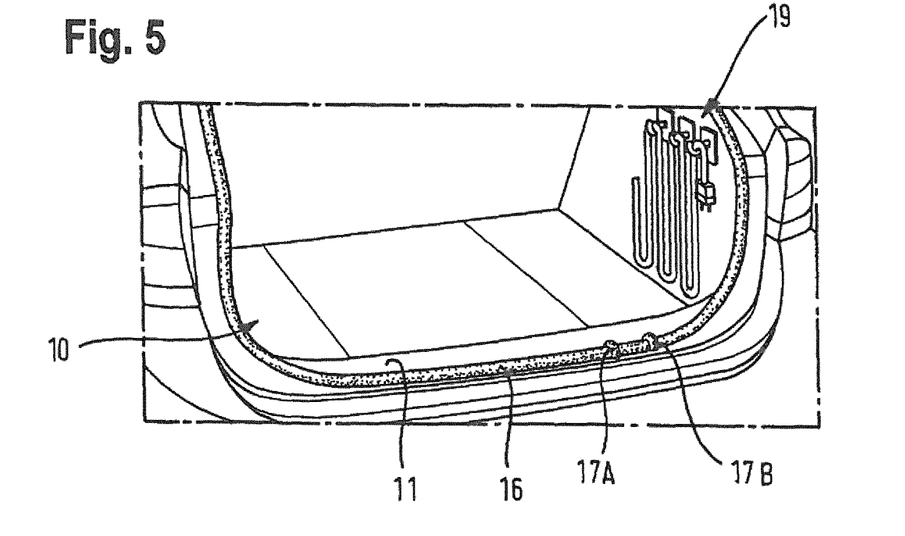
FIG. 5 shows a tail view of the opening edge of a rear trunk opening of a vehicle designed according to the invention.

FIG. 5 shows a luggage compartment opening 10 with the trunk lid 12 open. At the lower edge 11 of the luggage compartment opening 10 and/or on the seal 16, guide elements 17A, 17B formed by protruding beads, for example, are formed at a distance from each other, which distance corresponds to the width of the ribbon cable 20 or of the ribbon cable section 201, or is slightly larger than said width.

In the interior of the luggage compartment, a schematically shown safekeeping device 19 for the charging cable 2 is provided by way of example in FIG. 5. The charging cable (or the unextended portion thereof) can be accommodated in a defined manner in the vehicle by way of the safekeeping device 19.

The guidance of the ribbon cable 20 or of the ribbon cable section between the guide elements 17A, 17B is to take place in combination with the cable accommodation in the safekeeping device 19 so as to achieve preferably optimal cable guidance at all times. In particular, the guidance is to ensure that the cable does not slide out of place before the flap is closed. In addition or instead of the described mechanical guidance of the cable between the guides 17A, 17B, a magnetic cable fixation may also be provided in the region of the cable passage as a guide elements.

Figure 6:
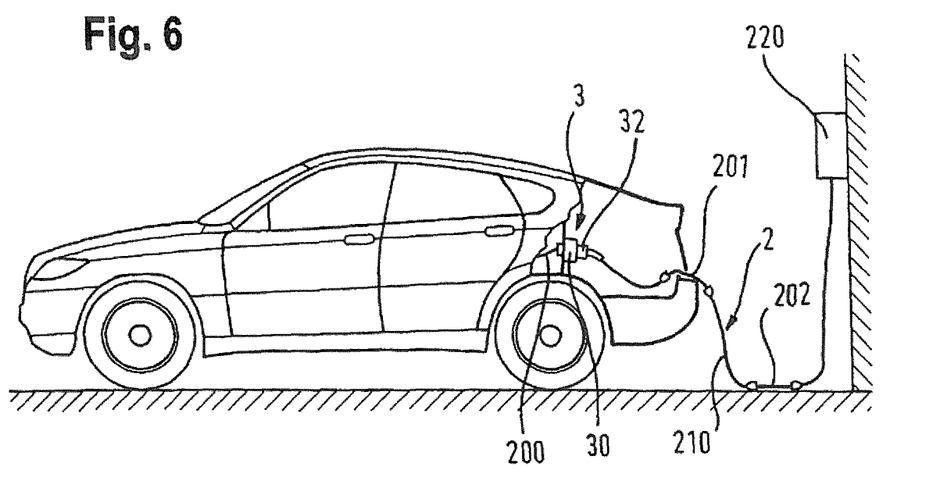
FIG. 6 shows a partially cut side view of a vehicle according to the invention of the first variant according to a first embodiment.

FIG. 6 shows a first embodiment of a vehicle according to the invention according to the first variant. In the vehicle, a vehicle-side electrical connecting element 30, such as a charging socket, of an electrical connecting device 3 is provided in the interior of the luggage compartment. The charging socket is electrically connected by way of a vehicle-side charging cable portion 200 to the vehicle units to be supplied with current, such as a storage device.

An external charging cable portion 210 of the charging cable 2 is electrically connected to a charging station 220 fixedly installed outside the vehicle. The external charging cable portion 210 is provided with two ribbon cable sections 201, 202 spaced apart from one another. The ribbon cable section 201, as was already described above, is fed between the trunk lid 12 and the luggage compartment opening 10, and the free end of the external charging cable portion 210 provided with an external connecting element, such as a charging connector, is located in the interior of the luggage compartment, wherein the charging connector 32 is plugged into the charging socket 30 and establishes the electrical connection between the storage device in the vehicle and the charging station 220.

The charging socket is provided in the well-protected interior in this embodiment. Only the portion of the charging cable that is actually required must be located on the outside. The other portion is situated in the interior, protected from weather influences and from soiling. The cable portion located on the ground is minimized.

The luggage compartment lock is also used to lock the charging cable, which is thus also protected from theft or unauthorized detachment of the electrical connection. As inductive charging is expected to become more prevalent, charging by way of a cable will be carried out less and less frequently. As a result, a charging socket that is accessible from the outside through a charging flap in the car body is even less justifiable. The solution according to the invention for the cable feedthrough is thus gaining in attractiveness.

Figure 7:
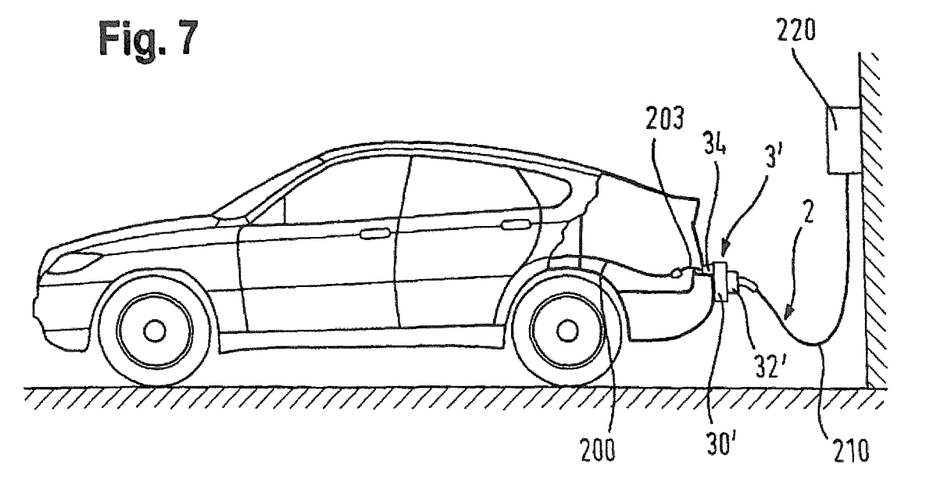
FIG. 7 shows a partially cut side view of a vehicle according to the invention of the first variant according to a second embodiment.

In another embodiment of the vehicle according to the invention according to the first variant shown in FIG. 7, the charging socket 30' is electrically connected to one end of a vehicle-side charging cable section 200. The other end of the vehicle-side charging cable section 200 leads to the vehicle units to be supplied with electric current. The vehicle-side charging cable section 200 is provided with a ribbon cable section 203, which forms a feedthrough element and on which the charging socket 30' is provided. The charging socket 30' is provided with a holder 34, which is adapted to the vehicle contour in the region of the lower edge section 14 of the luggage compartment opening 10 and allows the charging socket 30' to be fixed temporarily in the outer region of the vehicle body. The external charging cable 210, which with one end thereof is electrically and mechanically connected to the charging station 220, is plugged with the charging connector 32' provided at the free end thereof into the charging socket 30'.

For these cases in which the charging cable 2 is rigidly connected on one side, which is to say with the vehicle-side charging cable section 200, to the infrastructure of the vehicle, the charging socket 30' is released from the holder in the luggage compartment and hooked into the trunk sill, for example. The charging socket is fixed by way of the feedthrough element when the trunk lid is closed. The holder 34 including a shaped element ensures that the charging socket 30' is seated in a stable manner against the car body. The shaped element can be configured in such a way that it is adapted to the specific vehicle contour. As a result of the special configuration, easy adaptation to various body shapes can be achieved by replacing the shaped element.

Figure 8:
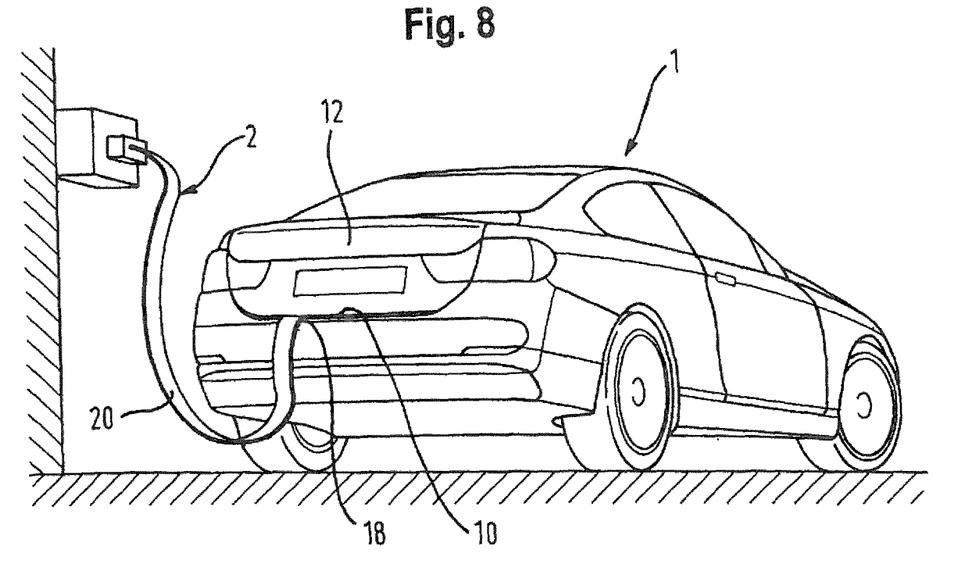
FIG. 8 shows an oblique tail view of a second variant of a vehicle according to the invention, which is equipped with a ribbon cable accommodated in a cable receiving device.

FIG. 8 shows a vehicle 1 according to the invention in a second variant, in which the charging cable 2 designed as a ribbon cable 20 is fed through a body opening 10 forming the luggage compartment opening. The charging cable 2 is provided in a cable receiving device 4 (FIG. 11) disposed in the interior of the body, for example in the luggage compartment. In the feedthrough region between the luggage compartment opening 10 and a body flap 12 forming the trunk lid, the flat charging cable 2 is positioned in the body gap 18 between the upper edge of the luggage compartment opening 10 and the lower edge of the trunk lid 12 when the trunk lid 12 is closed, without the charging cable 2 being crushed, as will be described based on FIGS. 8A and 8B. The charging cable 2 is only clamped in within the scope of the elasticity of the seal.

The ribbon cable 20 has a flat upper face 20' and a flat lower face 20" and is provided at least in regions with a soft, elastic surface so as not to leave any scratches upon contact with the body surface.

Figure 8A:
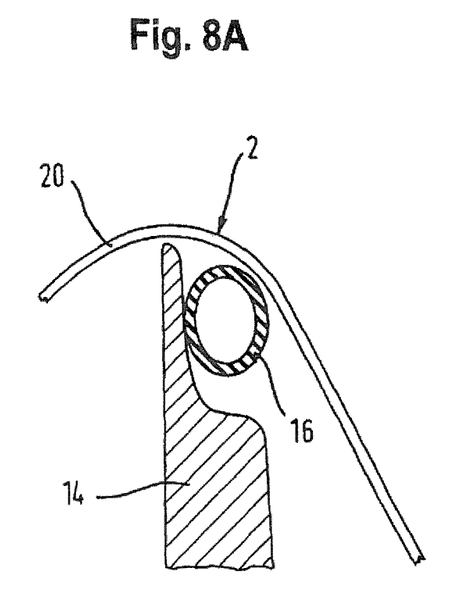
FIG. 8A shows a schematic cross-section through the lower edge of a trunk opening with the trunk lid open.
Figure 8B:
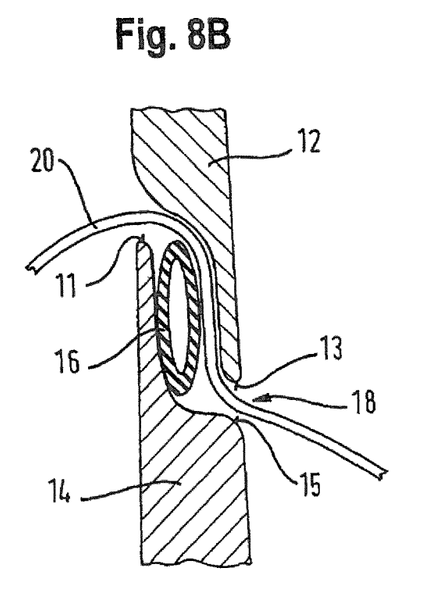
FIG. 8B shows a schematic cross-section through the lower edge of a trunk opening with the trunk lid closed.

FIGS. 8A and 8B show a vertical section through the vehicle body in the region of the trunk lid 12. The charging cable 2 designed as a ribbon cable 20 is placed over the lower edge section 14 of the luggage compartment opening 10, which is fixedly installed on the body, and the seal 16 provided thereon, as shown in FIG. 2A. The trunk lid 12 is then closed (FIG. 2B), wherein the ribbon cable 20 is gently clamped between the lower edge of the trunk lid 12 and the seal 16 as a result of the elasticity of the seal 16. The thickness of the charging cable 2 designed as a ribbon cable 20 is lower than the height of the body gap 18 between the lower edge 13 of the trunk lid 12 and the neighboring upper edge 15 of the edge section 14 of the luggage compartment opening 10 fixedly installed on the body. Due to this very flat design of the ribbon cable 20 and the resultant high flexural elasticity thereof, the ribbon cable 20 is able to conform to the contours of the lower edge of the trunk lid 12 and of the lower edge section 14 of the luggage compartment opening 10. The ribbon cable 20 can thus be fed through the existing body gap 18 between the lower edge 13 of the trunk lid 12 and the neighboring upper edge 15 of the edge section 14 of the luggage compartment opening 10, which is fixedly installed on the body, without the ribbon cable 20 being crushed or kinked beyond a permitted bending radius. The elasticity of the seal 16 allows the ribbon cable 20 to be fed through the gap 18 between the body opening 10 and the trunk lid 12 without damage.

The composition of the ribbon cable 20 in the cross-section through the ribbon cable 20 corresponds to the cable composition described in connection with FIG. 4.

The second variant of the vehicle according to the invention includes a cable retraction mechanism 40 provided in the cable receiving device 4. Here, the flat cable cross-section or the small bending radius is likewise taken advantage of.

Figure 9:
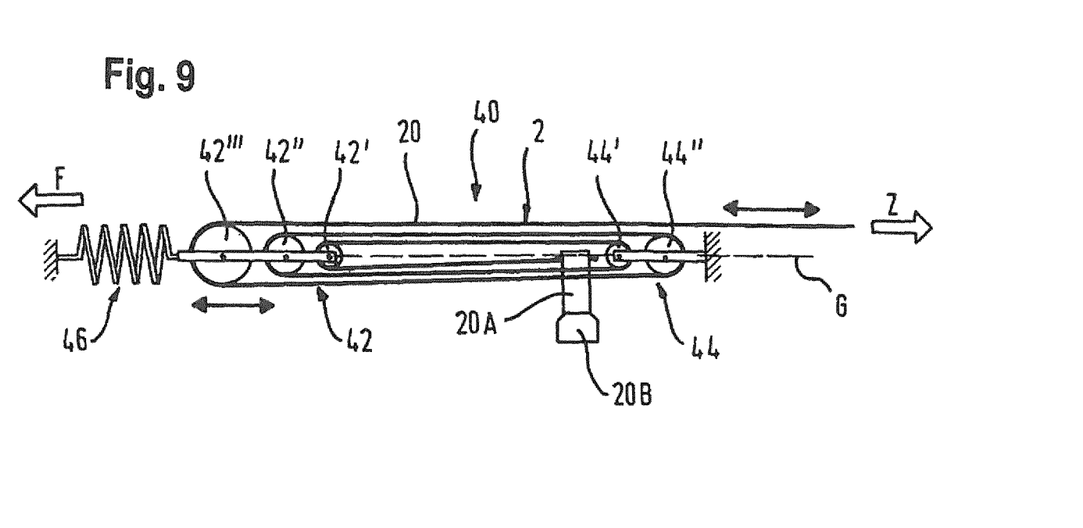
FIG. 9 shows a schematic representative illustration of a pulley of a cable receiving device.

FIG. 9 shows the principle of a tackle underlying such a cable retraction mechanism 40. The cable retraction mechanism 40 has a movable deflection roller system 42 and a stationary deflection roller system 44. The stationary deflection roller system 44 is directly or indirectly connected to the vehicle body. The movable deflection roller system 42 is likewise indirectly connected to the vehicle body by way of a tension spring forming an elastic element 46, but is linearly displaceable. In this way, the movable deflection roller system 42 can be moved in a translational manner relative to the stationary deflection roller system 44 under the force of the elastic element 46 along a straight movement line G. The movable deflection roller system 42 is guided in a translational manner for this purpose in a way that is known to a person skilled in the art.

The movable deflection roller system 42 includes three deflection rollers 42', 42", 42'", for example, the rotational axes of which are located on the straight translational line G. The rollers increase in diameter from the inside to the outside. The stationary deflection roller system 44 also includes multiple deflection rollers 44', 44", the rotational axes of which are likewise located on the straight translational line G and the diameters of which also increase from the inside to the outside. The ribbon cable 20 is fixed in the region of the stationary deflection roller system 44 and is fed laterally out of the cable retraction mechanism 40 with a connecting section 20A, which is provided with a connecting element 20B. Starting with the innermost smallest roller 42' of the movable deflection roller system 42, the ribbon cable 20 is guided similarly to a tackle around the respective rollers of the stationary deflection roller system 44 and of the movable deflection roller system 42, and runs from the largest deflection roller 42'" of the movable deflection roller system 42 in the direction of the cable exit opening of the vehicle, which is to say toward the tail-side body opening 10 in the example shown in FIG. 1. The individual sections of the ribbon cable 20 located on the cable retraction mechanism 40 are spaced apart from one another, so that an air space is formed in between, via which heat can be dissipated from the cable.

The charging cable can consequently be pulled out of the cable retraction mechanism 40 in the direction of the arrow Z using a tensile force acting against the spring force F of the elastic element 46. In the reverse direction, the spring force F pulls the charging cable 2 back into the retraction mechanism 40 when the tensile force diminishes. This is symbolically represented by the two double arrows in FIG. 9.

As is shown in FIG. 9, it is possible to implement very space-saving retraction concepts since very small bending radii are possible. No sliding contacts are needed since the cable does not carry out any torsional movements. According to FIG. 9, a spring is used to generate the retraction force. Alternatively, an electric actuator may also be provided as the traction drive mechanism. When a spring is used, a latch (not shown) is provided for the charging cable 2. In this way, constant tensile stress of the charging cable 2 is avoided.

Figure 10:
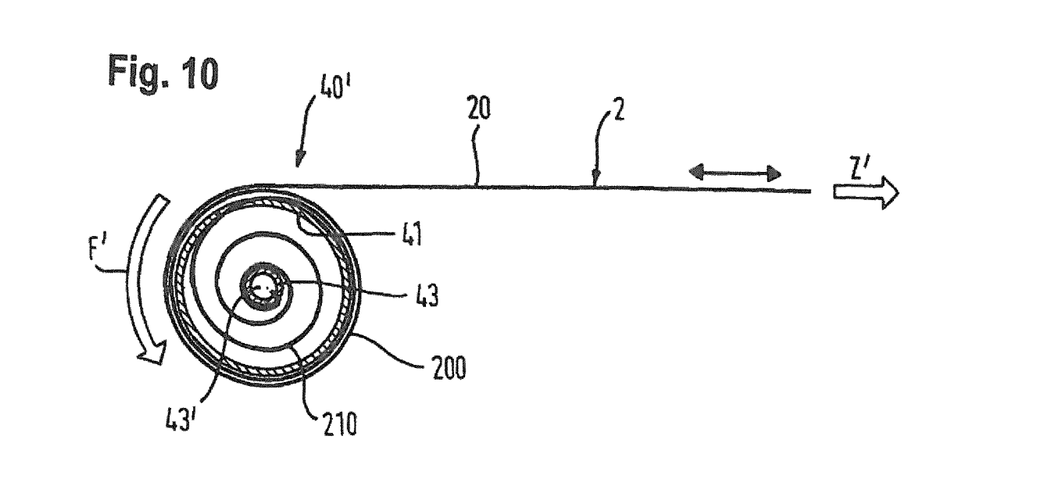
FIG. 10 shows a schematic representative illustration of a winding reel of a cable receiving device according to another embodiment.

FIG. 10 shows a cable roll-up mechanism 40', which can be provided in the cable receiving device 4 instead of the cable retraction mechanism 40. The cable roll-up mechanism 40' forming a winding mechanism is provided with an outer winding reel 41 onto which the extendible cable supply is rolled. The outer winding reel 41 defines the rotating part of the cable roll-up mechanism 40'. An inner, fixed reel axis 43 designed as a hollow pipe is connected to the outer reel 41 by way of a spiral spring, whereby the outer reel 41 can be rotated relative to the inner reel axis 43 against the force of the spiral spring (not shown). The spring force F' of the spiral spring is symbolically shown by the curved arrow in FIG. 10. The extendible cable supply 200 of the charging cable 2 designed as a ribbon cable 20 is rolled onto the outer reel 41. A cable reserve 210 of the ribbon cable 20 is provided in the interior of the outer reel 41, said cable reserve being rolled onto the inner reel axis 43 and with the free end thereof transitioning into the portion 200 of the ribbon cable 20 that is wound onto the outer reel 41. When the ribbon cable is pulled out of the cable roll-up mechanism 40' in the direction of the arrow Z' against the spring force F', the charging cable 2 is unwound from the outer reel 41 and, at the same time, wound onto the inner, fixed reel axis 43. Due to the hollow space 43' of the fixed reel axis 43, the free end of the charging cable 2 located there is guided out and connected to a wiring harness provided in the vehicle via an appropriate connecting device.

The cable retraction mechanism, in particular when the spiral spring principle is used (FIG. 10), can be provided with a temperature sensor, which causes the charging process to be shut down or the output to be reduced so as to prevent further heating of the charging cable 2.

Figure 11:
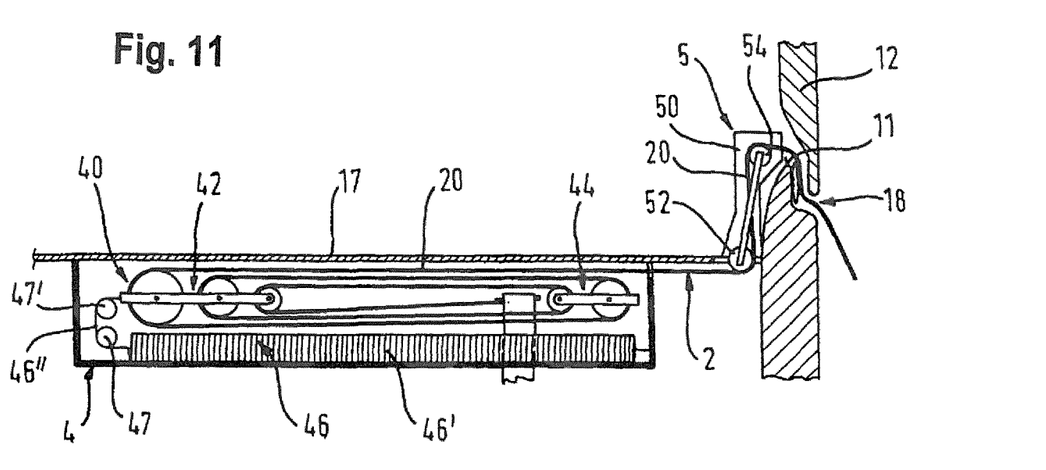
FIG. 11 shows a schematic representation of a cable receiving device according to the tackle-principle in the usage position.
Figure 12:
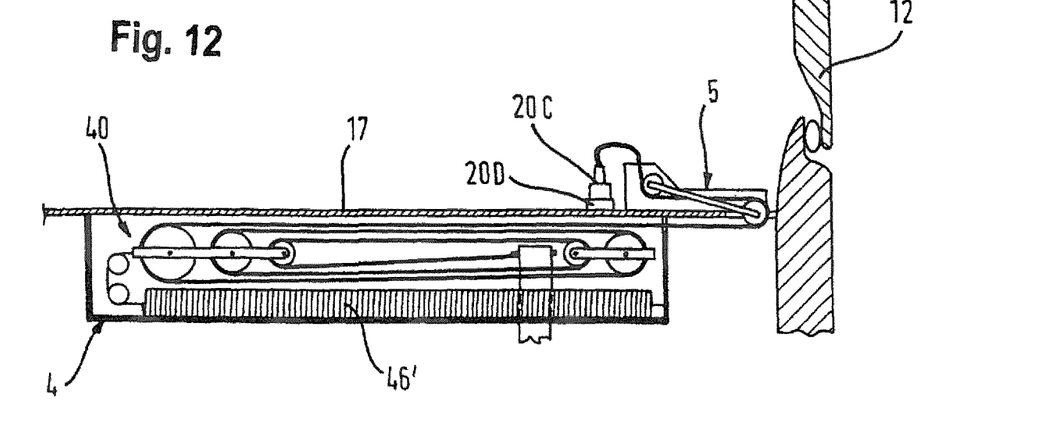
FIG. 12 shows the cable receiving device from FIG. 11 in the idle position.

FIGS. 11 and 12 show the cable retraction mechanism 40 from FIG. 9 as a component of a cable receiving device 4 installed in an underbody of the luggage compartment of the vehicle 1. The elastic element 46 is designed as a tension spring 46' here, which is disposed parallel along the portion of the ribbon cable 20 extending from the movable deflection roller system 42 to the stationary deflection roller system 44. For this purpose, the tension spring 46' is connected to the movable deflection roller system 42 via a cable pull 46", which is guided over two deflection rollers 47, 47', and, with the other end thereof, is fixedly connected to the body.

The charging cable 2 designed as a ribbon cable 20 is guided in the direction of the tail end of the vehicle out of the cable receiving device 4 beneath the luggage compartment floor 17, entering there from above through the luggage compartment floor 17 into a cable guiding device 5. The cable guiding device 5 includes a duct 50, which surrounds the ribbon cable 20 and in which a lower deflection roller 52 and an upper deflection roller 54 for the ribbon cable 20 are provided, around which the ribbon cable 20 is placed. In the readiness position shown in FIG. 11, the cable guiding device 5 extends from the luggage compartment floor 17 to the upper edge 11 of the luggage compartment opening 10. Slightly above the upper edge 11 of the luggage compartment opening 10, the ribbon cable 20 exits the cable guiding device 5 and, as is shown in FIG. 8B, is guided to the outside through the body gap 18 between the luggage compartment opening 10 and the closed trunk lid 12.

Once the charging process has been completed and the charging cable 2 has been accommodated again in the cable receiving device 4, the cable guiding device 5 is pivoted inward (forward in the driving direction) by 90° about the axis of the lower deflection roller 52 and ends up seated on the luggage compartment floor 17. It goes without saying that it is also possible to design the cable guiding device 5 in such a way that it ends up seated beneath the luggage compartment floor 17 in the idle position thereof (shown in FIG. 12). The free end of the charging cable 2 provided with a connecting device, such as a current connector 20C, for example, may be fixed in a holding device 20D for the connecting device 20C.

To cleanly feed the charging cable 2 through the body opening 10 in the location of the feedthrough, the cable guiding device 5 is proposed as a guide mechanism that prevents an oblique kinking of the charging cable 2 when the body flap 12 is being closed. The cable guiding device may be foldable so as to prevent a kinking of the charging cable 2 in both cases where the flap is closed with and without the charging cable guided to the outside (cable is located entirely in the luggage compartment).

Figure 13:
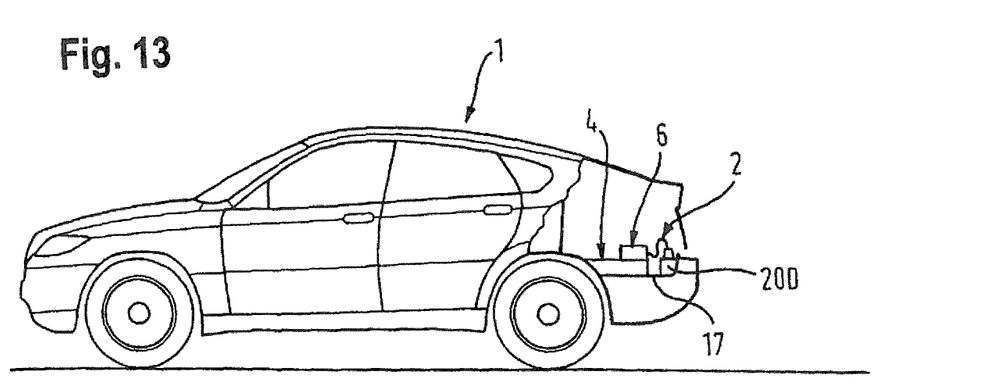
FIG. 13 shows a partially cut side view of a vehicle according to the invention of the second variant according to a first embodiment.

FIG. 13 shows a partially cut side view of a first embodiment of a vehicle 1 according to the invention of the second variant, which in the tail of the vehicle is equipped with a cable receiving device 4. In the idle state shown in FIG. 13, the charging cable 2 is stowed in the vehicle, and the free end of the charging cable 2, together with the connecting device 20C attached thereto, is fixed in the mounting 20D provided for this purpose. In the example shown here, the charging cable 2 is equipped with an in-cable box 6, in which charging electronics are provided, so that the charging cable 2 can be connected directly to a stationary power supply unit. The in-cable box 6 is likewise latched on the or beneath the luggage compartment floor 17 in a mounting provided for this purpose.

Figure 14:
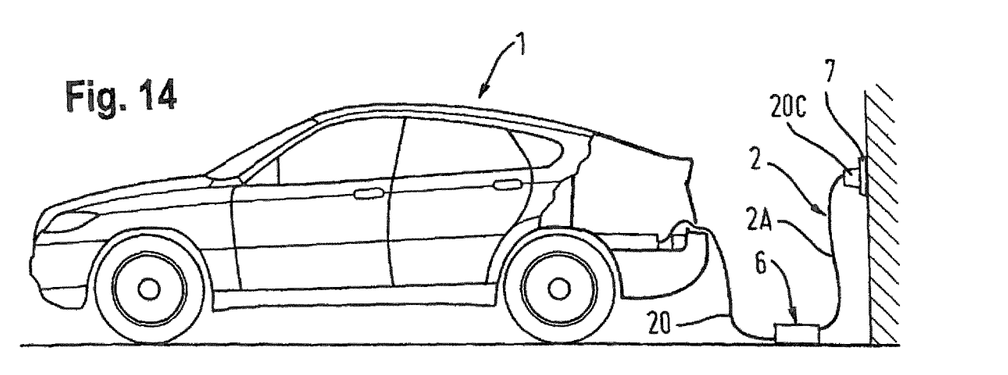
FIG. 14 shows a partially cut side view of a vehicle according to the invention of the second variant according to the first embodiment in which the charging cable is extended.

FIG. 14 shows the vehicle 1 from FIG. 13 in the charging state, in which the connecting device 20C of the charging cable 2 is connected to a corresponding mating connecting device 7 of a stationary power supply unit. It is apparent from FIG. 14 that the in-cable box 6, together with the charging electronics contained therein, is provided in the charging cable 2. In this case, section 2A of the charging cable 2 between the in-cable box 6 and the connecting device 20C does not have to be designed as a ribbon cable, but may also be designed as a conventional cable having a round cable cross-section. The remaining portion of the charging cable 2 leading from the in-cable box 6 into the vehicle, however, is designed, as described, as a ribbon cable 20.

Figure 15:
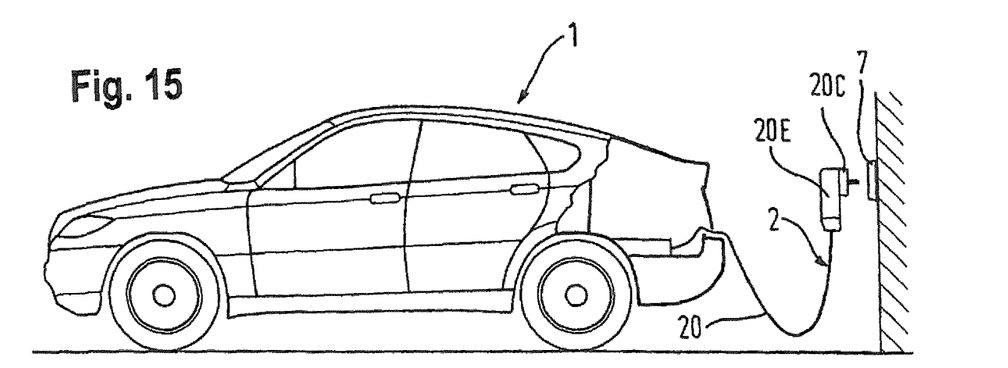
FIG. 15 shows a partially cut side view of a vehicle according to the invention of the second variant according to a second embodiment.

FIG. 15 shows a second embodiment of a vehicle 1 according to the invention of the second variant, which is shown in FIG. 14 in the charging state. There, however, the charging electronics is not accommodated in an in-cable box 6 provided in the charging cable 2, but in a connecting element housing 20E attached directly to the connecting element 20C, so that no in-cable box is needed in the variant of FIG. 15. The charging cable 2 is designed entirely as a ribbon cable 20 in this variant.

Figure 16:
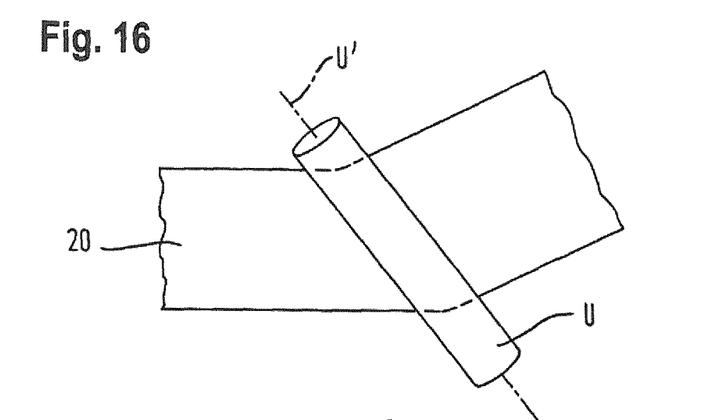
FIG. 16 shows a ribbon cable deflection device.

FIG. 16 schematically shows how the progression of the ribbon cable 20 can be deflected by way of a deflection roller U, which is inclined with respect to the longitudinal extension direction of the ribbon cable 20. In this way, the ribbon cable 20 can be deflected about a defined axis U' of the deflection roller at an angle of up to approximately 180°. If the ribbon cable 20 is guided over multiple deflection rollers in this way, arbitrary progression paths can be implemented for the ribbon cable 20. Due to the flat cross-section, it is possible to guide the cable using deflection rollers between the body opening 10 and the cable retraction mechanism 40. Since the charging cable 2 can be guided over deflection rollers, almost any arbitrary path of the charging cable 2 is possible. For protection, this may be surrounded by a duct.

Figure 17:
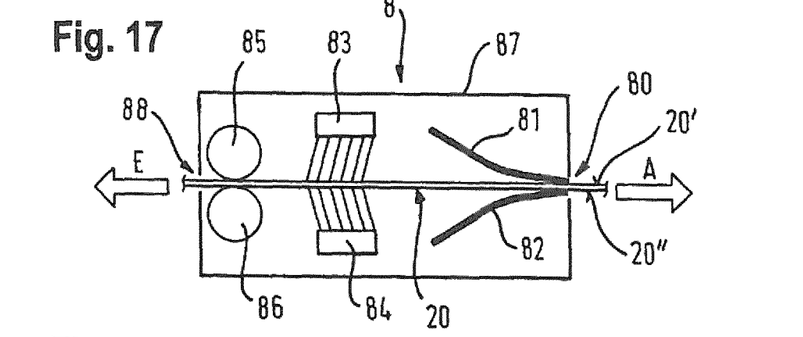
FIG. 17 shows a schematic top view onto a cable cleaning device for a ribbon cable in a cable receiving device according to the invention.
Figure 18:
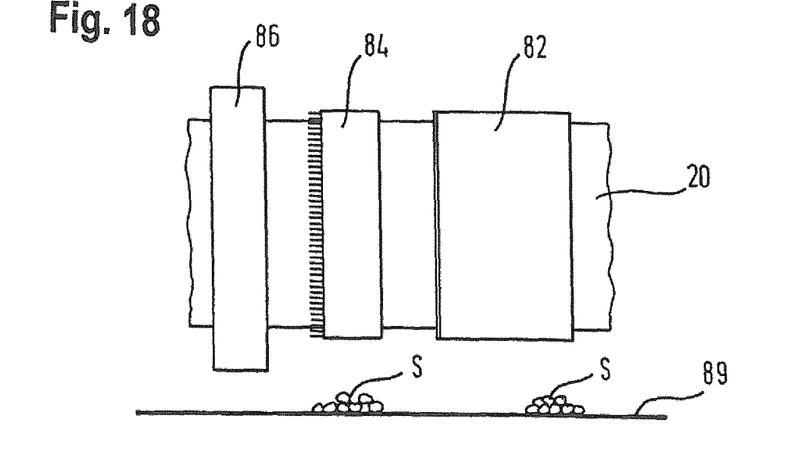
FIG. 18 shows a schematic side view onto a cable cleaning device for a ribbon cable in a cable receiving device according to the invention.

FIGS. 17 and 18 show a cable cleaning device 8 for the ribbon cable 20. In the representation of FIG. 17, the ribbon cable 20 leads to the cable receiving device 4 on the left and to the body opening 10 on the right. Accordingly, arrow A denotes the extension direction and arrow E denotes the retraction direction of the ribbon cable 20. On the rear cable exit side 80 of the cable cleaning device 8 pointing toward the body opening 10, a first wiping lip 81 is disposed on the upper face 20' of the ribbon cable 20 and a second wiping lip 82 is disposed on the lower face 20" of the ribbon cable 20. The wiping lips, which are made, for example, of a plastic material that does not damage the surface of the ribbon cable, are used to remove coarse dirt particles adhering to the ribbon cable 20 during retraction of the ribbon cable 20 in direction E.

In the retraction direction downstream of the wiping lips 81, 82, a respective brush is provided on the upper face 20' of the ribbon cable 20 and on the lower face 20" of the ribbon cable 20, namely an upper brush 83 and a lower brush 84, which clean still adhering finer soiling from the ribbon cable 20. The ribbon cable 20 is then guided through two guide rollers 85, 86, so as to then exit on the front cable exit side 88 of the housing 87 of the cable cleaning device 8 which points toward the cable receiving device 4.

FIG. 18 shows a side view of the cable cleaning device 8, wherein it becomes apparent that the ribbon cable 20 is conducted vertically through the cable cleaning device 8, so that dirt particles S can fall onto a dirt collection tray 89 of the cable cleaning device 8 by virtue of gravity. So as to prevent dust, soiling and moisture from penetrating into the cable retraction mechanism, a wiping mechanism of a cable cleaning device 8 can be attached to the guide of the charging cable 2, for example, which wipes dirt residue when the charging cable 2 is fed back. The dirt residue then ends up in a region in which the residue can be easily removed during a cleaning process of the vehicle.

According to the invention, it is thus proposed to configure the charging cable in such a way that it can be fed through existing openings on the vehicle, in particular through a luggage compartment opening. This is possible due to a very flat and highly flexible design of the cable in the corresponding region. In the closed state, for example of the trunk lid, the cable is fed through the existing gap dimensions and by elastic compression of the seal. The invention has the advantage that no separate charging flap in the body is needed.

Reference numerals and signs in the claims, the descriptions and the drawings are only intended to provide a better understanding of the invention and are not intended to limit the scope of protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle comprising:
a storage device for electric energy that is rechargeable from an external power supply unit;
a vehicle body comprising at least one body opening closable by way of a body flap; and
a charging cable, which is electrically conductively connected or connectable to the storage device and runs at least in regions in an interior of the body, wherein
the body opening is a luggage compartment opening or a door opening, and the body flap is a trunk lid or a door of the vehicle,
the charging cable includes a flexible ribbon cable,
the flexible ribbon cable is feedable through a body gap present between an edge of the body opening and an edge of the body flap,
the flexible ribbon cable comprises current-carrying conductors that are disposed next to one another and that are designed as flat, ribbon-shaped conductors and are surrounded by a shared, electrically insulating sheath, and
the flexible ribbon cable is electrically connected to a vehicle-side cable section by way of a first, vehicle-side contacting device, and to an external cable section of a charging cable portion provided with the flexible ribbon cable by way of a second, external contacting device.

2. The vehicle according to claim 1, wherein
the flexible ribbon cable is structured such that the body opening is closable while the flexible ribbon cable is disposed in the body gap.

3. The vehicle according to claim 1, wherein
the flexible ribbon cable comprises a ribbon-shaped signal conductor, which is disposed next to the current-carrying conductors and is surrounded by the electrically insulating sheath.

4. The vehicle according to claim 1, wherein
the flat, ribbon-shaped electrical conductors are each formed by a wire mesh.

5. The vehicle according to claim 1, wherein
the flexible ribbon cable viewed in cross-section, comprises an upper flat protective ground conductor and a lower flat protective ground conductor above and/or below the current-carrying conductors, said upper and lower flat protective ground conductors being surrounded by the electrically insulating sheath.

6. The vehicle according to claim 1, wherein
the flexible ribbon cable has a flat upper face and a flat lower face.

7. The vehicle according to claim 1, wherein
the flexible ribbon cable is provided with a soft, elastic surface at least in regions.

8. The vehicle according to claim 1, wherein
at least one of the first and second contacting devices is provided with a soft, elastic surface.

9. The vehicle according to claim 1, wherein
the flexible ribbon cable is provided in a vehicle-side charging cable portion, adjoining a vehicle-side connecting element, so that the vehicle-side connecting element can be fed out of the body.

10. The vehicle according to claim 1, wherein
the flexible ribbon cable is provided in an external charging cable portion, adjoining an external connecting element, so that the external connecting element can be fed into the interior of the body.

11. The vehicle according to claim 1, wherein
the flexible ribbon cable is clamped by way of a seal provided between the body opening and the body flap as a result of an elasticity of the seal when the body flap is closed.

12. The vehicle according to claim 1, further comprising:
guides for the flexible ribbon cable, by way of which the flexible ribbon cable is positionable, said guides being provided at the edge of the body opening, at the edge of the body flap and/or on a seal provided between the body opening and the body flap.

* * * * *